(12) United States Patent
Ureta Hortigüela et al.

(10) Patent No.: US 8,998,464 B2
(45) Date of Patent: Apr. 7, 2015

(54) TRIM PART FOR AUTOMOBILE WITH INTEGRATED LIGHTING DEVICE AND PROCESS FOR MANUFACTURING IT

(75) Inventors: Ricardo Ureta Hortigüela, Burgos (ES); Jesús Vicente Escudero Delgado, Burgos (ES); Alejandro Jorro De Inza, Burgos (ES)

(73) Assignee: Grupo Antolin-Ingeniera, S.A., Burgos (ES)

( * ) Notice: Subject to any disclaimer, the term of this patent is extended or adjusted under 35 U.S.C. 154(b) by 389 days.

(21) Appl. No.: 13/532,073

(22) Filed: Jun. 25, 2012

(65) Prior Publication Data

US 2012/0327673 A1 Dec. 27, 2012

(30) Foreign Application Priority Data

Jun. 21, 2011 (EP) .................................. 11382302

(51) Int. Cl.
*B60Q 3/00* (2006.01)
*B60Q 3/02* (2006.01)
*B60R 13/02* (2006.01)

(52) U.S. Cl.
CPC ............. *B60Q 3/0279* (2013.01); *B60Q 3/004* (2013.01); *B60R 13/0225* (2013.01); *Y10T 29/49826* (2015.01); *B60Q 2500/10* (2013.01); *B60R 2013/0287* (2013.01)

(58) Field of Classification Search
CPC ...................................................... B60Q 3/004
USPC ............... 362/84, 479, 487, 490, 492; 29/248
See application file for complete search history.

(56) References Cited

U.S. PATENT DOCUMENTS

| | | | |
|---|---|---|---|
| 7,220,029 B2 * | 5/2007 | Bynum et al. | 362/490 |
| 7,661,703 B2 * | 2/2010 | Ono et al. | 280/730.2 |
| 7,699,510 B2 * | 4/2010 | Yoshihara et al. | 362/488 |
| RE42,340 E * | 5/2011 | Anderson et al. | 362/488 |
| 7,992,926 B2 * | 8/2011 | Tamakoshi | 296/187.09 |
| 8,162,519 B2 * | 4/2012 | Salter et al. | 362/488 |
| 8,506,141 B2 * | 8/2013 | Cannon et al. | 362/490 |
| 2002/0101738 A1 | 8/2002 | Misaras | |
| 2005/0265038 A1 * | 12/2005 | Muller | 362/511 |

FOREIGN PATENT DOCUMENTS

| | | |
|---|---|---|
| DE | 203 15 251 | 12/2003 |
| DE | 10 2005 036533 | 2/2007 |
| DE | 10 2009 000605 | 8/2010 |
| EP | 1 816 391 | 12/2003 |
| WO | 2006/057531 | 6/2006 |
| WO | 2007/028565 | 3/2007 |
| WO | 2010080945 | 7/2010 |
| WO | 2010/118795 | 10/2010 |

OTHER PUBLICATIONS

European Search Report for EP 11382302.5 issued Jan. 26, 2012 (9 pages).

* cited by examiner

*Primary Examiner* — Anabel Ton
(74) *Attorney, Agent, or Firm* — Banner & Witcoff, Ltd.

(57) ABSTRACT

Trim component with integrated lighting device comprising a lighting substrate, which in turn comprises a base substrate and a lighting substrate, said lighting substrate being covered by a decorative lining in which have been defined areas that allow light to pass and other areas that prevent light from passing, establishing by their combination a lighting pattern. These areas that allow light to pass are obtained by a laser treatment, removing at least one part of the material of said decorative lining.

24 Claims, 12 Drawing Sheets

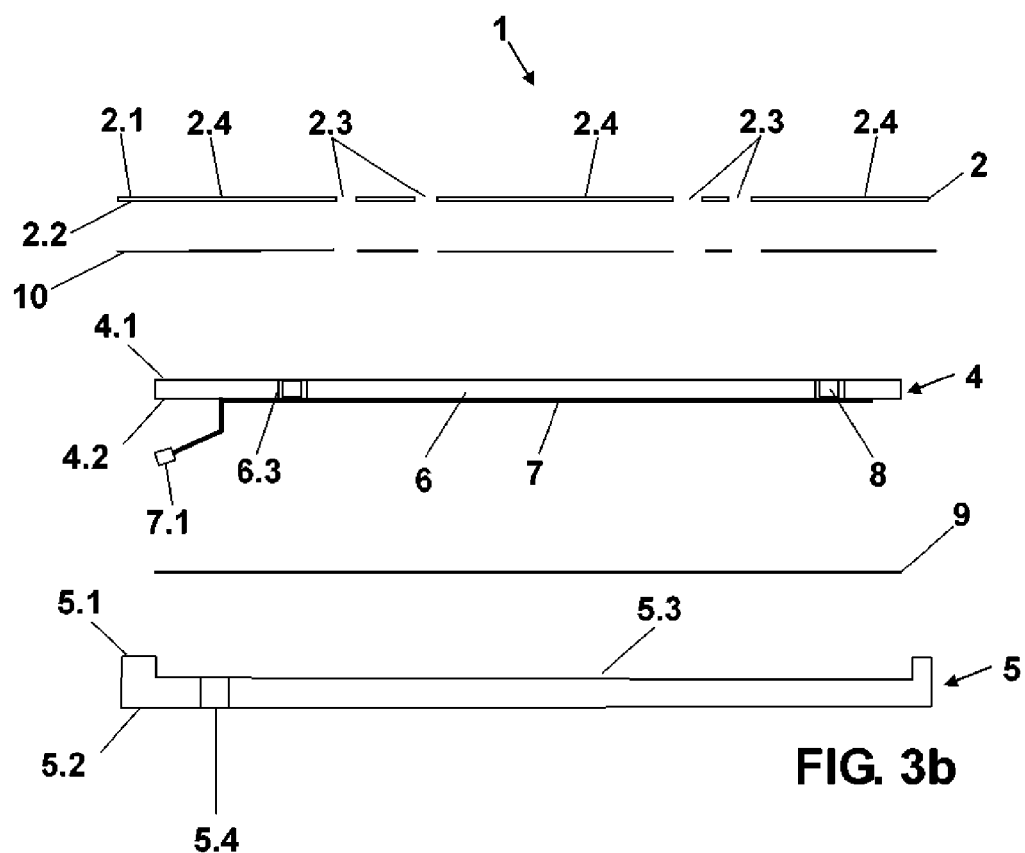
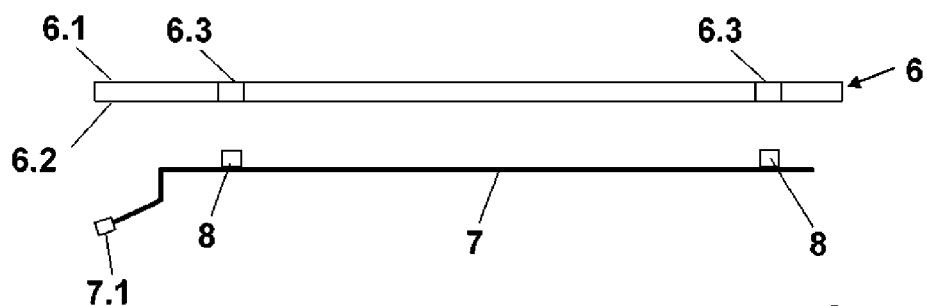
FIG. 3b
FIG. 3c

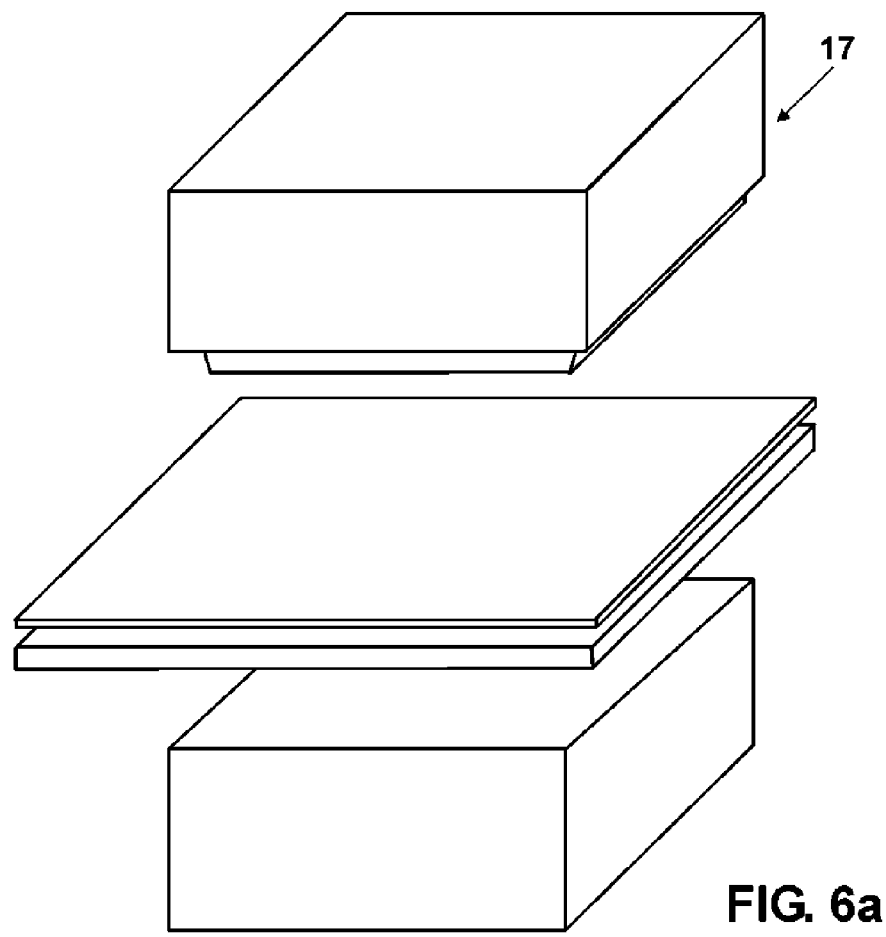
FIG. 6a
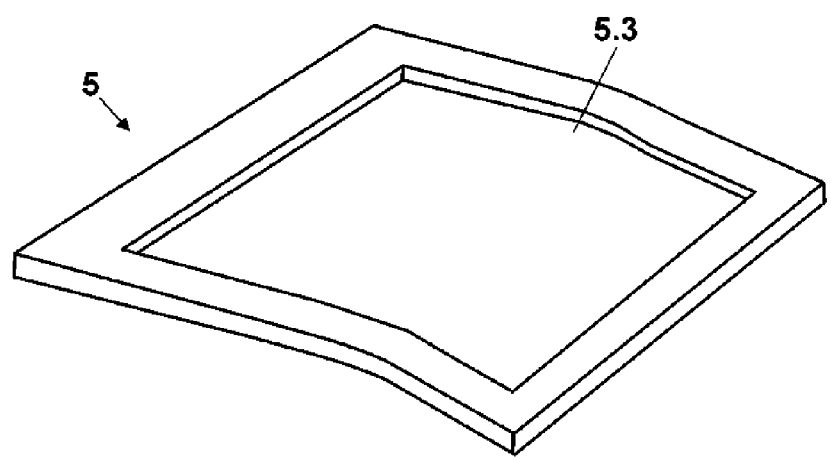

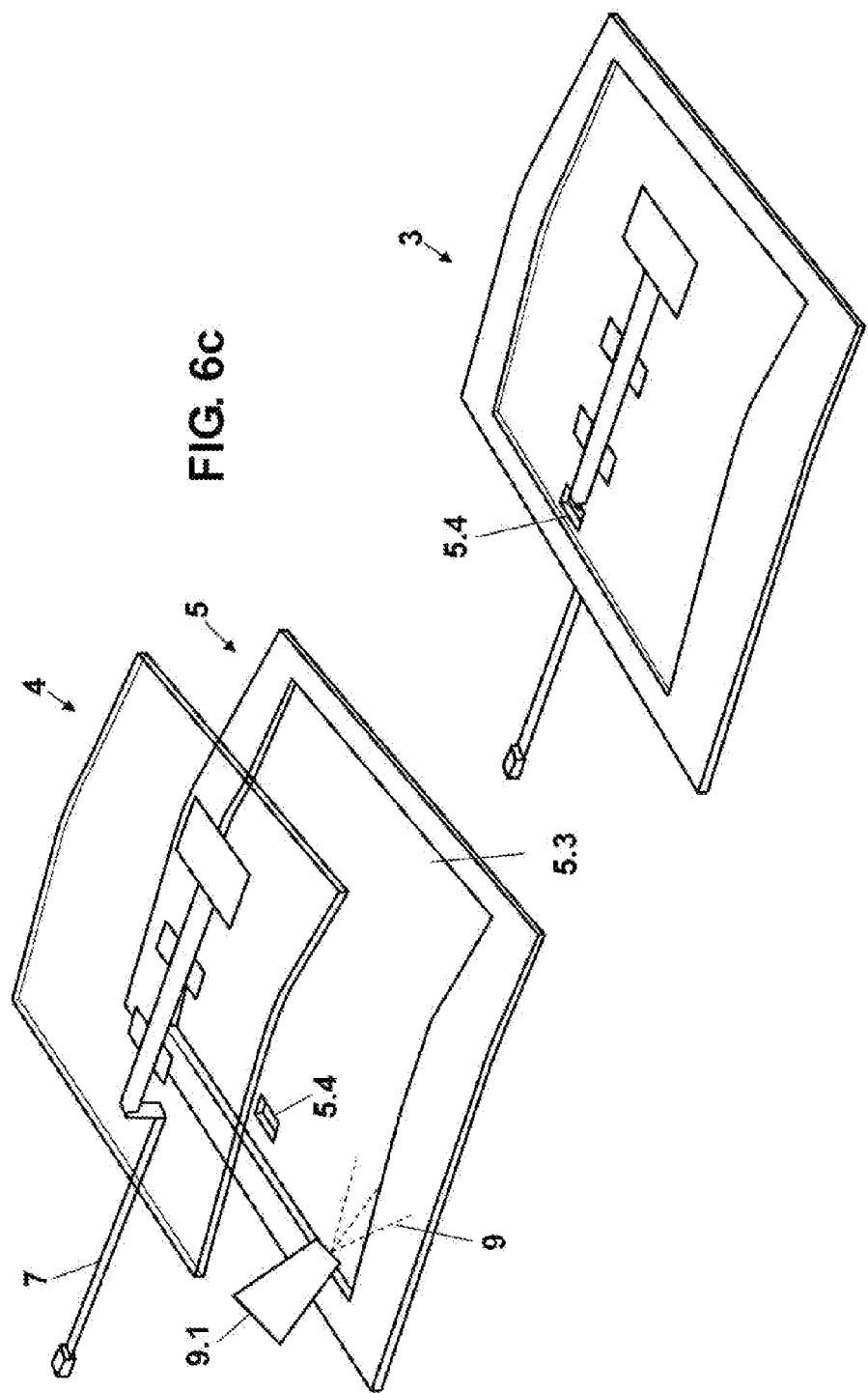

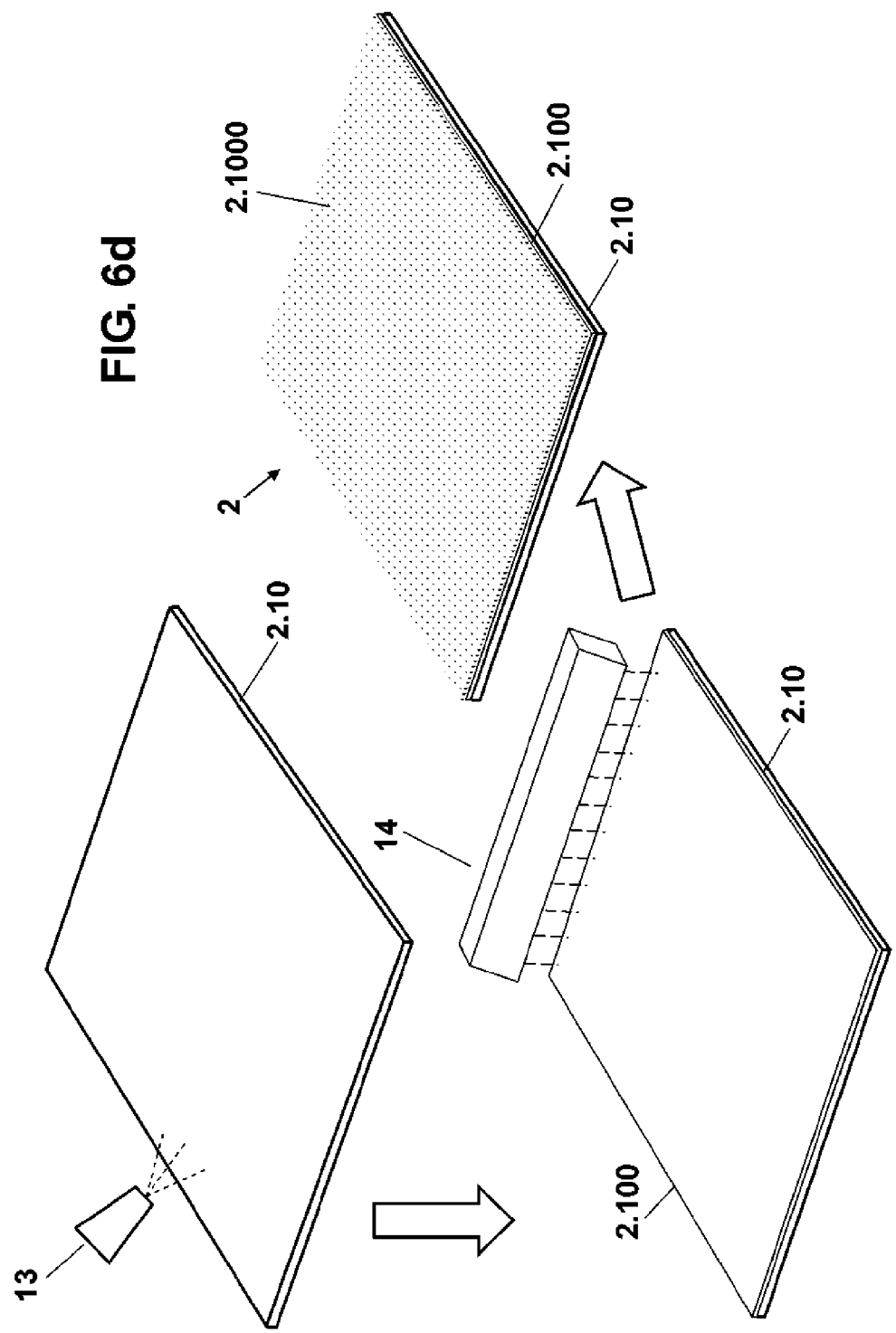

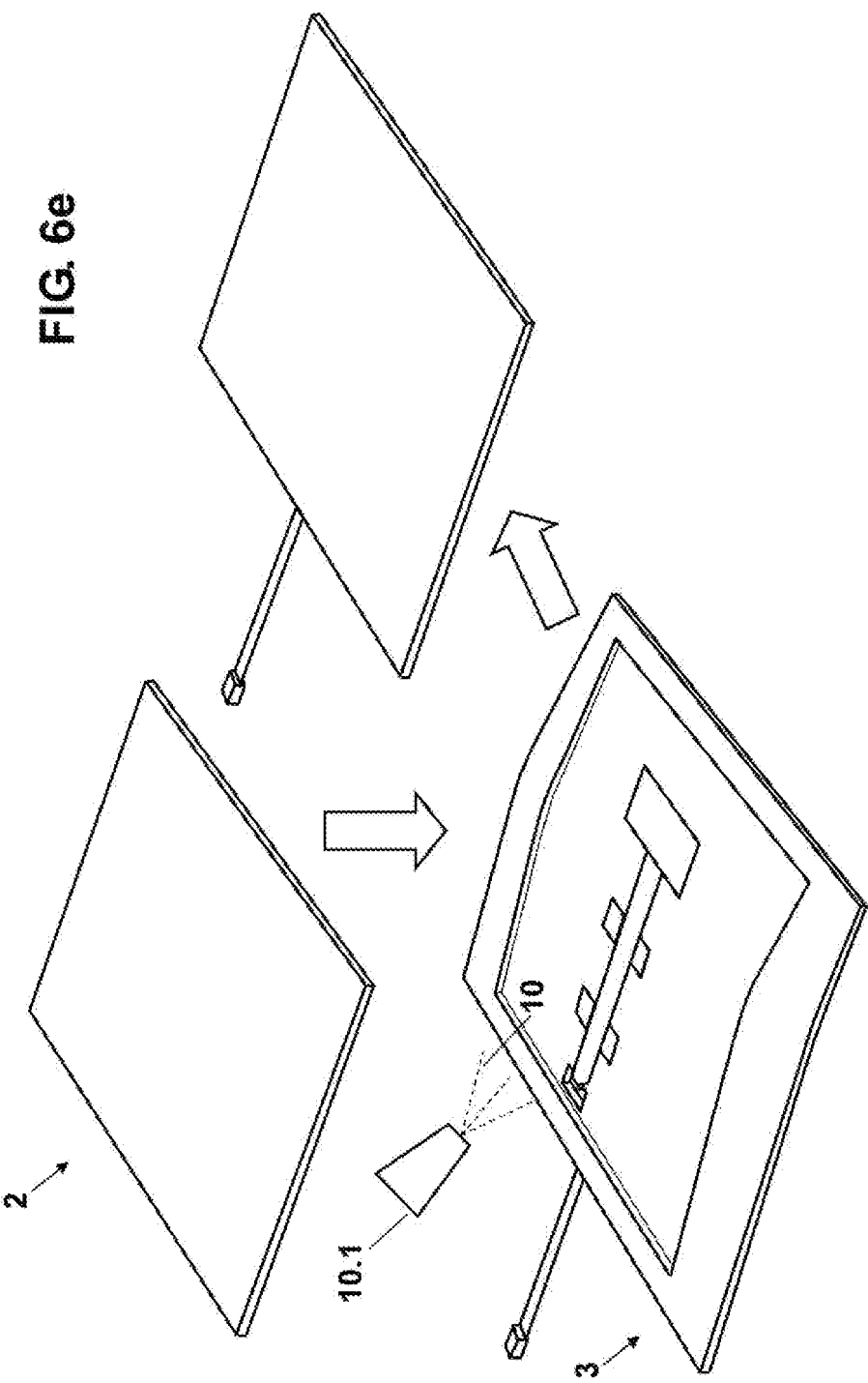

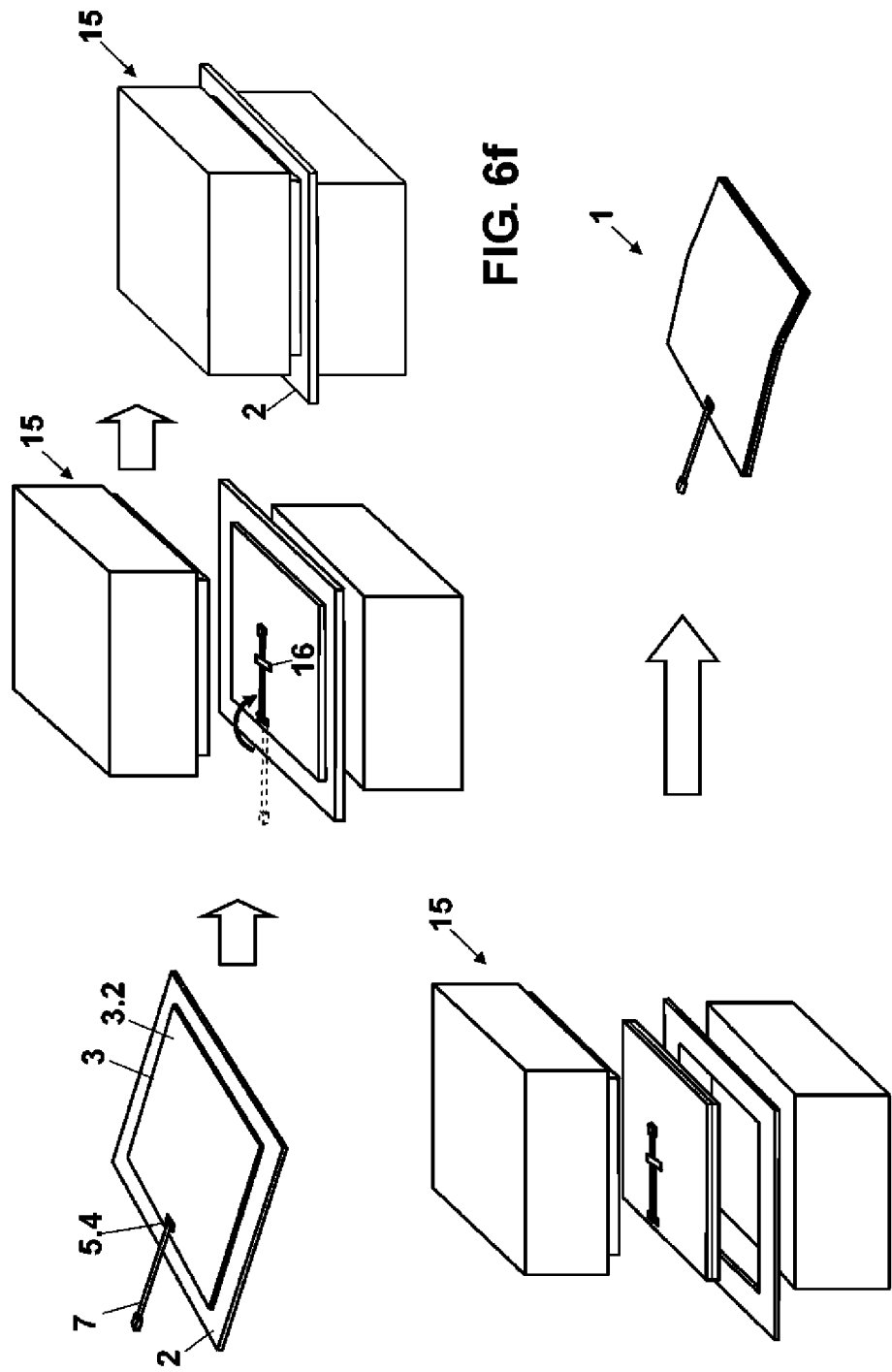

TRIM PART FOR AUTOMOBILE WITH INTEGRATED LIGHTING DEVICE AND PROCESS FOR MANUFACTURING IT

The present application claims priority to European Application No. 11382302.5, filed Sep. 21, 2011, the contents therein is incorporated by reference.

OBJECT OF THE INVENTION

The present invention relates to a trim part for an automobile with an integrated lighting device, the function of which is to provide a decorative light inside the vehicle cabin.

Additionally, the invention relates to a manufacturing process for this trim part with an integrated lighting device.

Specifically, the trim part with integrated lighting device of the invention comprises a compact assembly with a small thickness, easy to handle and assemble, in which is established a control for the light emitted from inside the trim part towards the vehicle cabin by configuring in it localised areas that allow light to emerge in a personalised manner, and a control of the quality of the light emitted through said localised areas that allow the light to emerge.

BACKGROUND OF THE INVENTION

A trim part, such as for a roof, is a vehicle element normally formed by superposing several layers that are joined to one another and are formed by applying heat and pressure.

As a result of this formation, a laminar element with a reduced thickness is obtained that is adapted to the shape of the inside of the vehicle body, specifically to the area of the body in which it is placed and with the function of covering the metal of said body, providing an aesthetic finish among other functions.

Thus, a trim part has a mainly aesthetic purpose, as it is an element that is seen from inside the vehicle cabin.

In addition, a roof trim part can have other functions associated to the various layers that make up its structure, such as structural, insulating or acoustic enhancement functions.

In order to improve the comfort of the vehicle cabin, a trim part can incorporate other elements in addition to those that make up its structure, providing additional functions such as illumination.

Specifically, the illumination function can encompass several different types of illumination meant to provide enough light to allow the occupants to distinguish the outline of the objects that are inside the cabin.

A reading light refers to the illumination function meant to provide enough light so that occupants can read books or documents.

When the purpose of the illumination function is to provide a decorative effect, defining visible illuminated shapes, this is referred to as a decorative light.

These functions are not mutually exclusive, so that several illumination functions can be combined in a single lighting device.

The trim part of the present invention comprises a decorative illumination function, although it optionally can also include any of the other illumination types described above.

To fulfil this illumination function meant to provide decorative lighting, it is possible to assemble on a trim part lighting devices that provide decorative light to the inside of the vehicle cabin, making these trim parts modular assemblies.

In addition, and in order to obtain more compact modular assemblies, trim parts are known that comprise the lighting devices for obtaining decorative light in which the lighting elements are not disposed assembled but as an integral part of the trim part, resulting in a compact assembly.

One of the purposes of these assemblies is to achieve a good integration of the lighting devices in the trim parts that house them, in some cases making them imperceptible when the lighting device that generates the decorative light is not on.

To achieve this goal, and considering that a trim part consists of a laminar element with a small thickness, the lighting devices must also comprise elements with a small thickness, such as for example electro-luminescent sheets or small LED light sources, which can be integrated between the various layers of the part, so that they do not significantly increase the thickness of the assembly.

These examples are illustrated by Patents EP1418090, EP2215296, DE102006012606.

In these cases in which the area to illuminate is large, the proposed solution is to use a lighting source that is able to illuminate an area as large as the area of the trim part to be illuminated, such as a set of LEDs distributed evenly in said area, or an electroluminescent panel of the same size as the trim part area to be illuminated.

Therefore, these lighting assemblies can be complex and costly for applications in which the surface to illuminate is large.

To solve this problem, it is possible to use a lighting guide element for the light emitted by the lighting source, so that the number of lighting sources or their size is not affected so greatly by the dimensions of the surface to illuminate.

In this sense are known patents JP59011934 and EP1536983, for example.

In these two antecedents the lighting source is placed on a lateral area corresponding to the perimeter of the guide element, resulting in an assembly with dimensions that exceed the perimeter of the trim itself, so that the assembly is not very compact and fragile, and requires protective element for the lighting source to prevent it from being damaged, and additional reflective elements to make full use of the light emitted by said lighting source.

This complicates the handling and/or transportation operations of the trim part, due to the protruding arrangement of the lighting sources or their protective and reflective elements with respect to the perimeter of said trim part, and can result in damage or breakage of said lighting sources.

Moreover, said protruding arrangement of the lighting sources and the other additional elements implies increasing the space occupied by the assembly, both in its transportation and when it is assembled inside the vehicle.

Therefore, the incorporation of said lighting sources inside the trim part so that they are disposed without protruding from the perimeter of the trim part and perfectly protected inside it is considered to be an improvement.

Patent DE102006012606, for example, describes solutions of this type.

In this antecedent no control is established for a localised exit of the light, as the decorative lining used consists of a translucid element that allows light to pass through it.

Therefore, in addition to a compact assembly that simplifies handling and assembly of the roof trim part with the lighting device integrated in it, the goal is a configuration of the assembly such that it allows controlling the light let out through certain areas of the trim part located appropriately, in order to obtain decorative light according to certain predefined patterns.

This control of the light outlet is established firstly regarding the versatility or customisation of light exit patterns, so that the decorative lining has localised areas that allow light to exist and areas that stop it, allowing complete freedom of design, and secondly regarding the quality, so that said light exit areas that define the light patterns are configured by perfectly defined contours which also allow diffusing the light in a uniform manner in the light exit areas.

By achieving these two objectives, namely controlling the light exit through localised areas with a uniform shape and the perfect definition of the contours of said light exit areas, the user will perceive a high-quality product, which is the ultimate objective of the present invention.

DESCRIPTION OF THE INVENTION

The present invention therefore relates to a trim part for an automobile having an integrated lighting device to provide decorative lighting that comprises a first layer facing the inside of the vehicle cabin, through which the light exits from inside the trim part, and a second part facing the vehicle body, such that said trim part comprises a lighting substrate and a decorative lining, wherein:

the decorative lining comprises a first face facing the inside of the cabin and a second face facing the vehicle body, and also comprises two differentiated areas, some that prevent the light from passing and others that allow the light to pass towards the inside of the cabin;

the lighting substrate comprises a first face facing the inside of the vehicle and a second face opposite the first face, this is, facing the vehicle body, wherein said lighting substrate comprises:

A base substrate that comprises a first face facing towards the inside of the cabin and a second face facing towards the vehicle body, wherein said base substrate is formed by one layer or by a set of layers;

A lighting device that comprises:
Electricity conducting means;
A lighting source that comprises a LED;
Lighting guide means for the light emitted by a lighting source in the form of a light-conducting laminar element, which have first layer facing toward the vehicle cabin and a second face facing toward the vehicle body;

Adhesive means for joining the decorative lining to the lighting substrate;

Wherein:
The lighting substrate is located between the base substrate and the decorative lining;
The lighting guide means:
Are located between the decorative lining and the base substrate:
Comprise a light conducting laminar element that copies the shape of the trim part;
Have an orifice located on the second face of said guiding means in correspondence with the lighting source;

At least one part of the electricity conducting means are located between said base substrate and the lighting guide means;

The lighting source:
Is connected to the electricity conducting means and is at least partially housed in the orifice made in the guide means;
Emits a lighting beam which, through a lateral wall of the orifice, enters the lighting guide means and is led and propagates through them, until reaching the areas that allow the light to exit;

The decorative lining:
Covers the first face of the lighting substrate;
Has areas that allow light to pass obtained by removing at least one part of the decorative lining by a laser treatment, leaving uncovered the lighting guide means so that the position of the lighting source is not directly in correspondence with the areas that allow light to exit the decorative lining.

In addition, the invention relates to a process for obtaining a trim part for an automobile with an integrated lighting device for providing decorative lighting, formed by a first face facing towards the inside of the vehicle cabin and through which the light can exit the inside of the trim, and a second face facing the vehicle body, where said trim comprises a lighting substrate and a decorative lining, wherein:

the decorative lining comprises a first face facing the inside of the cabin and a second face facing the vehicle body, and also comprises two differentiated areas, some areas that prevent the light from passing and other areas that allow the light to pass towards the inside of the cabin;

the lighting substrate comprises a first face facing the inside of the vehicle and a second face opposite the first face, this is, facing the vehicle body, wherein said lighting substrate comprises:

base substrate that comprises a first face facing towards the inside of the cabin and a second face facing towards the vehicle body, wherein said base substrate is formed by one layer or by a set of layers;

A lighting device that comprises:
Electricity conducting means;
A lighting source that comprises a LED;
Lighting guide means for the light emitted by a lighting source in the form of a light-conducting laminar element, which have first layer facing toward the vehicle cabin and a second face facing toward the vehicle body;

Adhesive means for joining the decorative lining to the lighting substrate; Characterised in that the process comprises the following stages:

Obtaining the base substrate by forming one or more layers of material by applying heat, and by applying pressure in a press;

Obtaining the lighting device by executing the following stages:
Forming the laminar element that conducts the light to copy the shape of the trim part;
Making an orifice in the second face of the lighting guide means to house a lighting source, wherein said lighting source emits a lighting beam that, through a lateral wall of the orifice, enters the lighting guide means and is led by and propagates in them to reach the areas that allow the light to exit;
Positioning at least one said lighting source in said orifice of the lighting guide means so that the position of the lighting source is not in direct correspondence with the areas that allow the light to exit the decorative lining;
Attaching at least part of the electricity conducting means to the second face of the lighting guide means;

Obtaining the lighting substrate formed by joining the lighting device and the base substrate by positioning and attaching the lighting device on the base substrate, such that the first face of the base substrate is attached to the second face of the lighting device, Obtaining the decorative lining;

Attaching the decorative lining to the first face of the lighting substrate by:
   Applying some adhesive means either on the first face of the lighting substrate or on the second face of the decorative lining, or on both;
   Positioning and attaching the decorative lining on the lighting substrate by the adhesive means, so that the second face of the decorative lining is joined to the first face of the lighting substrate;
Cutting the lighting substrate covered with the decorative lining;
Establishing the areas that allow light to pass by removing at least one part of the decorative lining by a laser treatment, uncovering the lighting guide means.

The expression "trim part" refers to both a complete trim and to part of one that can be joined to another element to form a complete trim.

The expression "removing at least one part of the decorative lining by a laser treatment" refers to applying a laser beam to the decorative lining in order to remove at least one part of the material that forms it, leaving uncovered the lighting guide means and thereby allow the emitted light to exit through it.

When it is stated that the position of the lighting source is not in direct correspondence with the areas that allow the light to exit the decorative lining, it must be understood that the lighting source or LED is out of the projected area of the areas that allow the light to exit on the guide means, so that the light is not propagated directly from the lighting source but instead indirectly through the guide means.

The full integration of all the elements that make up the lighting device among the layers that make ump the trim part, achieves on one hand a compact assembly with a reduced thickness, easy to handle and assemble and that ensures the integrity of the more sensitive elements that make up the lighting device, such as the LEDs that make up the lighting source.

On another hand, and thanks to the aforementioned integration of the elements that make up the lighting device, an assembly is obtained that maintains the appearance of a conventional trim part, so that the elements that form part of the lighting device do not create undesirable marks in the decorative lining, thereby offering the appearance of a conventional trim part with the lighting device is no on.

In addition, and thanks to the creation of the areas that allow light to pass by the laser treatment of the decorative lining in localised areas, the configuration of a light pattern by using a laser beam becomes a simple and versatile operation.

In this way, it is not necessary to make use of a different decorative lining for each application, simply to execute on a single decorative lining the light patter by applying a laser treatment on it once it forms part of the trim part.

On another hand, the execution of the light exit areas by a laser treatment greatly enhances two aspects that directly affect the quality of the light exit through said light exit areas.

The first of these aspects is associated with the definition of the contours that form the areas of the lining that allow the light to exit, and the other is associated with the uniformity of transmission of the light through said lining areas.

The use of a laser treatment allows defining accurately the lines that configure the contours of the areas that allow the light to exit.

The laser treatment also results in the removal of the material that forms part of the lining in a clean and precise manner, adjusting it perfectly to the predetermined light pattern that defines the light exit areas.

On another hand, the ability to control the uniformity of the material removed from the decorative lining, in addition to allowing an accurate definition of the contours that define the areas that allow the light to exit, also allows a uniform transparency of said areas by the full removal of the excess decorative lining material.

This uniform transparency, together with the use of lighting guide means in combination with the lighting sources, allow the light to be transmitted in a uniform manner.

In a specific case of the invention, the decorative lining can be configured by a flocking element formed either by support means, adhesive means and a layer of flock, or by a layer of flock.

The use of a decorative lining with these characteristics allows acting directly on the control of the light exit through it, and specifically allows improving the opacity of areas that prevent light exit, as said flocked decorative lining acts as an opaque element in itself.

In this way, it is possible to improve the opacity of the decorative lining, and specifically of its areas that prevent light from exiting, without having to add additional layers under said flocked decorative lining.

In short, the trim part with integrated lighting device described provides direct advantages to the user of said product by combining the aspects that ct on the quality of the light emitted through the lining areas that allow the light to exit, together with the good appearance of the trim part due to the full integration of the elements that make up the lighting device.

This improves the quality perceived by the user of the vehicle provided with a trim part having these characteristics, as regards the appearance of said trim part, both when the lighting device is not in operation and when it is emitting light through the decorative lining.

Furthermore, the trim part of the invention also has direct advantages for its manufacturer, on one hand due to the characteristics of the manufacturing process for the trim part and specifically to the configuration of the light pattern using a laser treatment, which allows creating light exit areas in a versatile, simple manner at a low cost, and on another hand due to the optimisation of the lighting sources due to the use of lighting guide means in combination therewith, in addition to the action on the handling, transport and assembly of the trim part due to the integration of the elements that make up the lighting device.

DESCRIPTION OF THE DRAWINGS

The present descriptive memory is completed by a set of figures that illustrate a preferred embodiment of the invention and in no way limit it.

FIGS. 3a, 3b and 3c show three schematic sectional views of the various elements that form the trim part, according to the different grouping levels of their sub-components, so that FIG. 3a shows a schematic representation of the decorative lining separated from the lighting substrate, FIG. 3b shows the decorative lining separated from the lighting device and in turn separated from the base substrate, and FIG. 3c shows schematically the different sub-components that make up the lighting device, so that the electricity conducting means and the LEDs are separated from the lighting guide means.

In FIG. 4a both the support means and the adhesive layer that make up the flocked lining are formed by additional elements.

In FIG. 4b the lighting guide means are also the support means for the flocked lining, and the adhesive means for the decorative lining on the lighting substrate are also the adhesive layer of the flocked lining; therefore, in this case the flocked decorative lining is formed by a layer of flock.

Figure 4A:
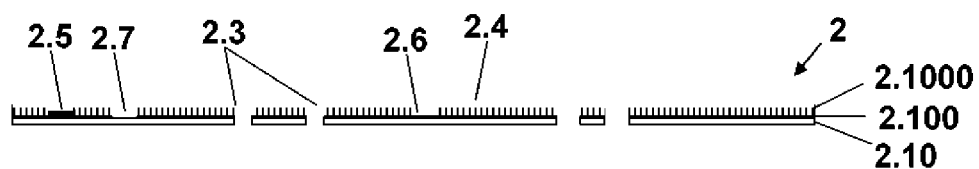
FIGS. 4a and 4b represent two schematic sectional views corresponding to two possible configurations of the decorative lining consisting of a flocked element.

In addition, the specific case of FIG. 4a shows other areas of the flocked decorative lining treated by applying a laser beam, which is controlled to obtained different depth levels, controlling the amount of material removed and thereby achieving different visual effects for the flocked decorative lining.

Figure 5:
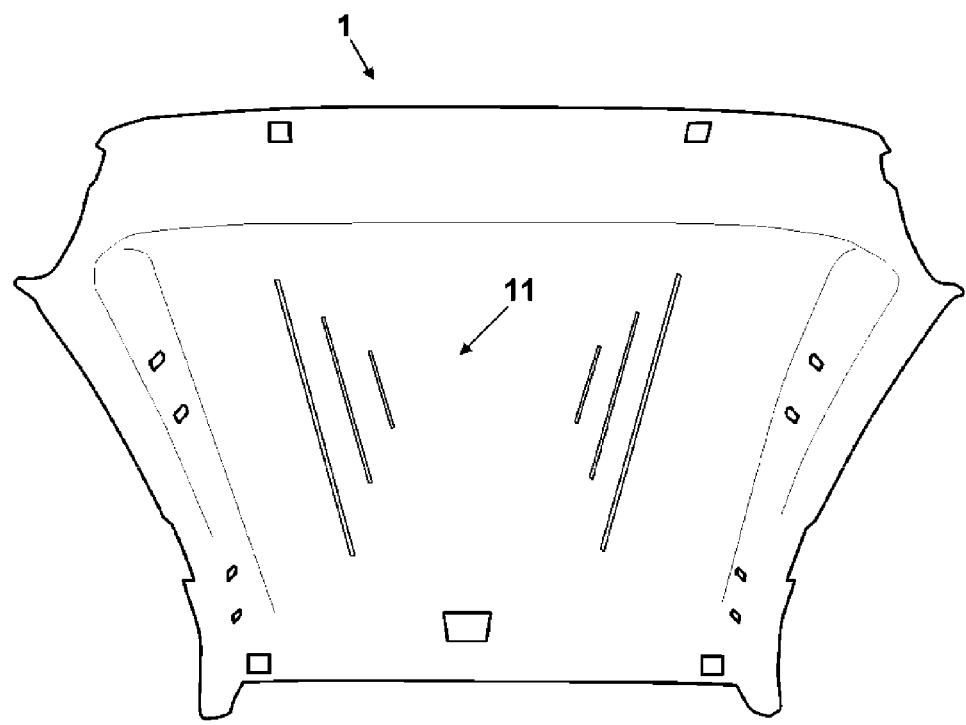

FIG. 5 shows a perspective view of a specific case of the invention applied to a roof trim part.

FIGS. 6a, 6b, 6c, 6d, 6e, 6f and 6g show a schematic representation of the stages that form part of the manufacturing process for the trim part with integrated lighting device.

DETAILED DESCRIPTION OF THE INVENTION

In view of the foregoing, the present invention relates to a trim part (1) with an integrated lighting device (4) that comprises a lighting substrate (3), which in turn comprises a base substrate (5) and a lighting device (4), said lighting substrate (3) being covered by a decorative lining (2) in which have been prepared some areas (2.3) that allow light to pass and other areas (2.4) that prevent light from passing, establishing by their combination a lighting patter (11). These areas (2.3) that allow light to pass are created by a laser treatment that removes at least part of the material of said decorative lining (2).

Figure 1:
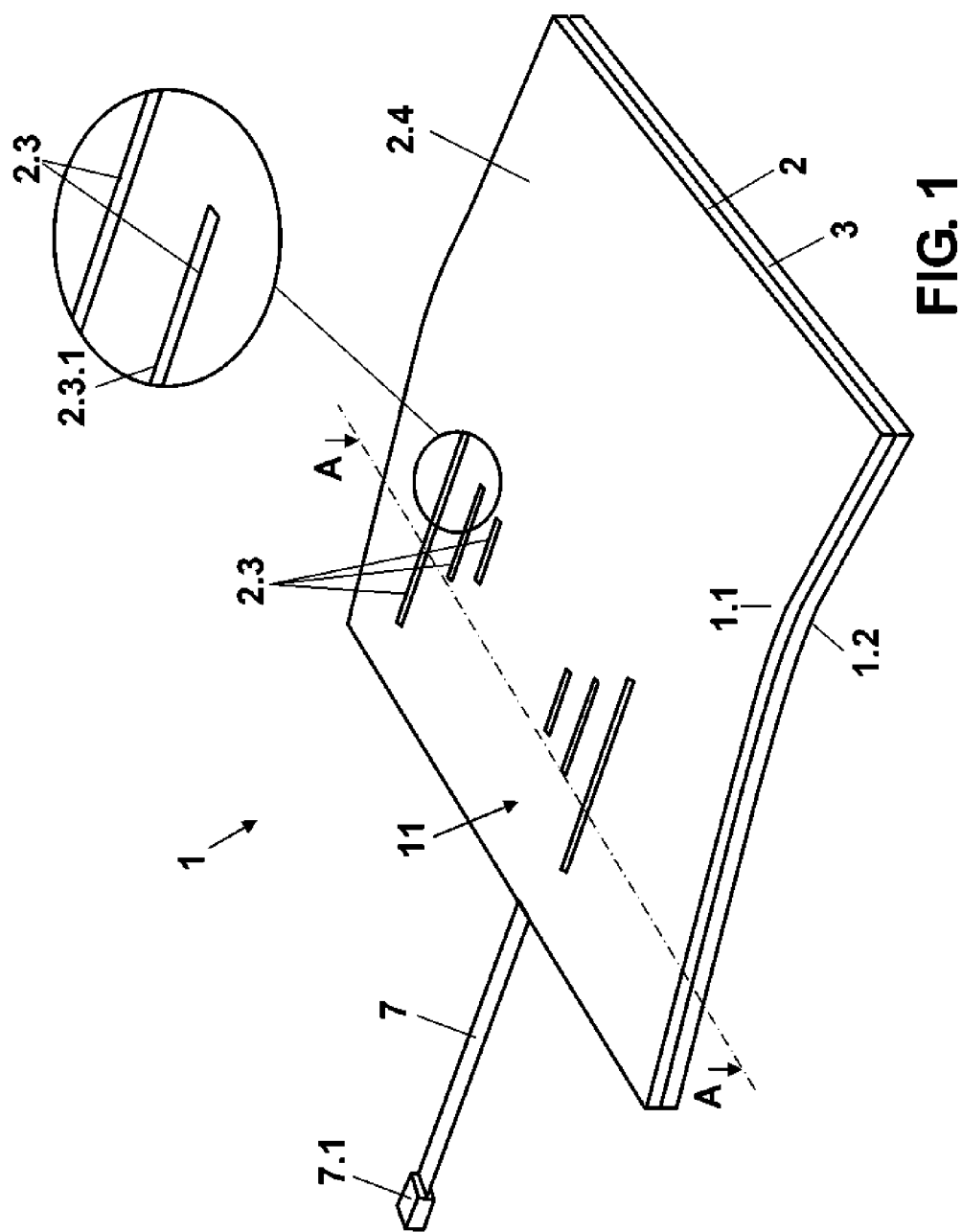
FIG. 1 shows a schematic perspective view of a trim part for an automobile with an integrated lighting device representing an example of a lighting pattern by a combination of the light exit areas and the areas that prevent light from exiting the decorative lining.

FIG. 1 shows a trim part (1) according to the invention, incorporating an integrated lighting device (4) for providing decorative lighting.

This trim part (1) has a first face (1.1) that faces towards the vehicle cabin, through which is established the light exit from inside the trim part, and a second face (1.2) that faces the vehicle body, in which is housed the trim part (1), which can be a roof trim, a door trim, a trim for covering a post, etc. or an element coupled to any of the foregoing for configuring a complete trim.

The trim part (1) of the invention is formed by a set of superimposed elements forming a laminar assembly, and specifically by a lighting substrate (3) that in turn comprises a base substrate (5) and a lighting device (4); and by a decorative lining (2) that completes the configuration of the trim part (1) covering the lighting substrate (3) on one of its sides.

The decorative lining (2) comprises a first face (2.1) facing towards the vehicle cabin and a second face (2.2) facing the vehicle body.

Figure 2:
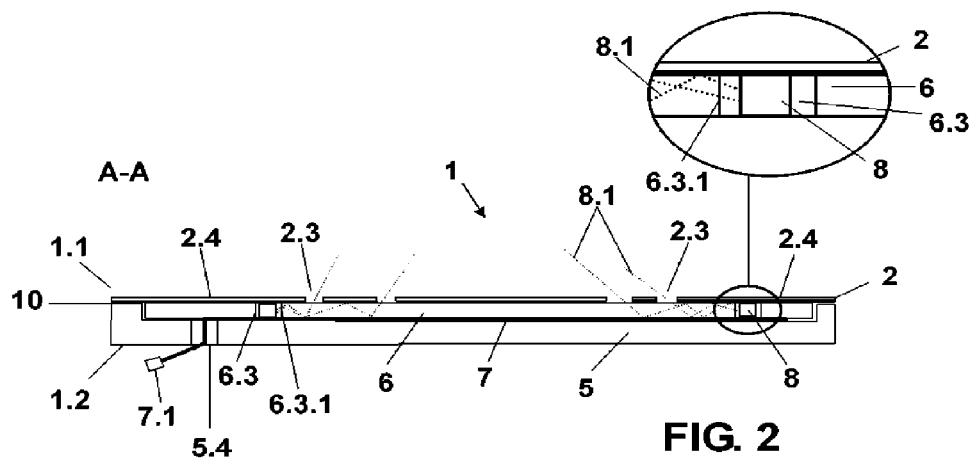
FIG. 2 shows a schematic sectional view along the AA line that allows distinguishing the different layers that form the trim with integrated lighting device, as well as the elements that form the lighting substrate. In addition, this figure represents a detail of the orifice area of the guide means that shows the direction followed by the lighting beams emitted by the lighting source.

The decorative lining (2) is the element on which the light pattern (11) is formed by combining the areas (2.3) that allow the light to exit said decorative lining (2), and the areas (2.4) that prevent the light from exiting it, as shown in the AA cross-section shown in FIG. 2.

The configuration of the areas (2.3) that allow the light to exit is obtained by a laser treatment that removes at least one part of the decorative lining (2), leaving uncovered the lighting guide means (4).

This laser treatment allows personalising the decorative lining (2) by creating a lighting pattern (11) on it in a versatile and simple manner, once that the decorative lining (2) forms part of the trim part (1).

In this way it is possible to obtain trim parts (1) with different lighting patterns (11), resulting in different decorative designs, in a single manufacturing line avoiding the need to have as many decorative linings (2) on which the lighting patterns (11) have been previously made as there are different lighting patterns (11).

Therefore, in a single process and with a single decorative lining (2) it is possible to simultaneously manufacture trim parts (1) with different appearance, as the laser treatment allows establishing the lighting pattern (11) directly on the trim part (1) after joining it to the decorative lining (2) with the lighting substrate, allowing to change in real time the design of this lighting pattern (11) for each trim part (1).

On another hand, the use of laser technology to configure the areas (2.3) that allow the light to exit allows firstly a perfect definition of the contours (2.3.1) that define these areas (2.3) and secondly the complete removal of the material that makes up the decorative lining (2) in these areas (2.3), ensuring a uniform distribution of the light.

Figure 4B:
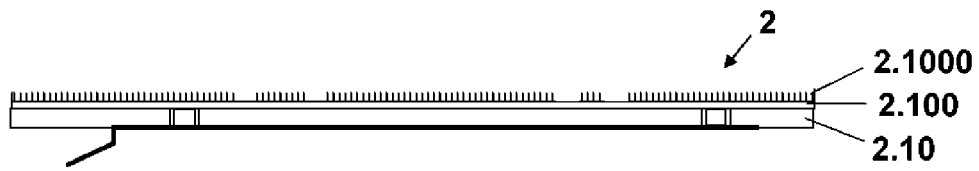

In a specific case of the invention, as shown in FIGS. 4a and 4b, the decorative lining (2) is formed by a flocked element that is in turn configured by superposing three elements, some support means (2.10), an adhesive layer (2.100) and a flock layer (2.1000) that forms the last layer of said decorative lining (2).

In a variant of the configuration of the flocked decorative lining (2), as shown in FIG. 4b, both the support means (2.10) and the adhesive layer (2.100) are eliminated, the support means being replaced by the lighting guide means (6) and the adhesive layer (2.100) by the adhesive means (10) for attaching the decorative lining (2) to the lighting substrate (3) described in detail further below.

Therefore, in this case the flock layer (2.1000) is joined directly to the first face of said lighting guide means (6) through the adhesive means (10) for attaching the decorative lining (2) to the lighting substrate (3).

The use of a decorative lining (2) with these characteristics, this is, a flocked decorative lining (2) allows acting directly on the control of the exit of the light emitted through it, and specifically allows improving the opacity of the areas (2.4) that prevents the light exit, as this flocked decorative lining (2) acts as an opaque element itself.

In this way, the opacity of the decorative lining (2) is improved without the need to add additional layers under said flocked decorative lining (2), particularly in the areas (2.4) of the lining that prevent the light from exiting.

With the laser treatment, as shown in FIG. 4a, it is possible to act on at least one part of the flocked decorative lining (2) by removing all of the layers that make up this decorative lining (2), in order to obtain the areas (2.3) that allow light to exit.

In addition to these areas that allow light to exit, as shown in FIG. 4a, the laser treatment operation on the flocked decorative lining (2) allows obtaining other areas (2.5, 2.6, 2.7) in order to obtain different finishes of the flocked decorative lining (2) according to the amount of material removed that forms part of the flocked decorative lining (2).

The different finishes of the flocked decorative lining (2) are achieved by adjusting the parameters of the laser beam used to execute the laser treatment, such as intensity, progress speed, frequency, etc.

Specifically, the areas (3.5) of partial removal of the flock layer in at least one part of the decorative lining (2) are made by removing only one part of the flock layer (2.1000) by a laser treatment of the decorative lining (2), in which optionally the material forming this flock layer (2.1000) is darkened, thereby modifying the appearance of the flock layer (2.1000).

The areas (2.6) of full removal of the flock layer (2.1000) in least one part of the flocked decorative lining (2) are made by completely removing the flock layer (2.1000) by a laser treatment of the decorative lining (2), exposing the adhesive layer (2.100). In this way, a contrast of colours is obtained in the decorative lining (2), caused by the combination of the colour of the adhesive layer (2.100) and the flock layer (2.1000).

In addition, one can consider the possibility of obtaining an additional finish of the flocked decorative lining (2) formed by areas (2.7) of full removal of the flock layer (2.1000) and the corresponding adhesive layer (2.100) with at least part of the flocked decorative lining (2), in which the flock layer (2.1000) and adhesive layer (2.100) have been fully removed by laser treatment of the decorative lining (2), exposing the support means (2.10) that form the flocked decorative lining (2). In this way, in the variant shown in FIG. 4a, in which the support means (2.10) are formed by an additional layer, a contrast of colours is obtained in the decorative lining (2) caused by the combination of the colour of the support means (2.10) and the flock layer (2.1000) and/or the adhesive layer (2.100).

The final finish of the flocked decorative lining (2), in this specific case, can therefore consist of the combination of the areas (2.3) that allow light to pass and the areas (2.4) that prevent light from passing, with some of the areas (2.5, 2.6, 2.7) described above.

This combination would allow obtaining on a trim part (1) a day effect and a completely different night effect.

In the day effect, the vehicle occupants would predominantly perceive the finish produced by the areas (2.4) that prevent light from passing, in combination with the areas (2.5) of partial removal of the flock layer (2.1000), the areas (2.6) of complete removal of the flock layer (2.100) and the areas (2.7) of full removal of the flock layer (2.1000) and adhesive layer (2.100).

In the night effect, however, the vehicle occupants will predominantly perceive the finish produced by the areas (2.3) that allow light to exit, and particularly the effect of the light emitted through these in contrast with the areas (2.4) that prevent light from passing.

This is, the night effect allows the vehicle occupants to appreciate the decorative light pattern (11) formed by the combination of the areas (2.3) that allow light to exit and the areas (2.4) that prevent light from passing when the lighting source (8) is active.

Another of the elements that make up the trim part (1) with integrated lighting device (4) of the invention is the lighting substrate (3), which in turn comprises the lighting device (4) and the base substrate (5).

Figure 3A:
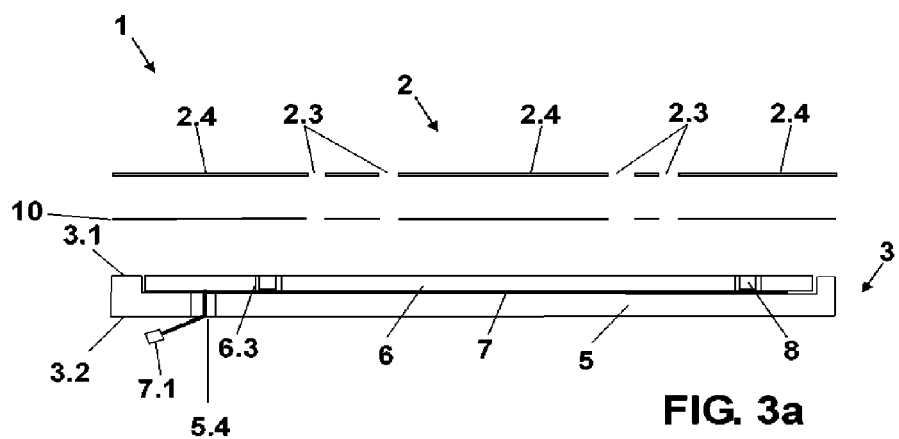

This lighting substrate (3) shown in FIG. 3a under the decorative lining (2) comprises a first layer (3.1) facing the inside of the vehicle cabin and a second face (3.2) facing the vehicle body.

Similarly, and as shown in FIG. 3b, both the base substrate (5) and the lighting device (4) comprise in turn a first face (5.1, 4.1) facing the inside of the cabin and a second face (5.2, 4.2) facing the vehicle body.

Specifically, the lighting device that forms the lighting substrate (3) is located between the base substrate (5) and the decorative lining (2).

The union of the lighting device (4) on the base substrate (5) can be achieved by housing it in a cavity (5.3) made in the base substrate (5) for this purpose, as shown in FIG. 3b, or simply resting on the surface of this base substrate (5), protruding out of its main surface on which the lighting device (4) rests.

This lighting device (4), as shown in FIGS. 3b and 3c, in turn comprises:
  Electricity conducting means (7) that can for example be a flat cable;
  A lighting source (8) that comprises at least one LED;
  Guide means (6) for the light emitted by the lighting source (s) first face (6.1) facing the inside of the vehicle cabin and a second face (6.2) facing the vehicle body.

At least part of the electricity conducting means (7) are located between the base support (5) and the lighting guide means (6) that form the lighting device (4).

The lighting guide means (6) are located between the base support (5) and the decorative lining (2).

These lighting guide means (6) comprise at least one laminar element that copies the shape of the trim part (1), completely adapting to it and thereby favouring the integration of the lighting device (4) in said trim part (1).

In order to house at least on LED (8) of the lighting source that forms the lighting device (4), these lighting guide means (6) have at least one orifice (6.3) made in their second face (6.2) in correspondence with said LED (8).

As regards the lighting source, the number of LEDs (8) can vary according to the surface of the trim part (1) to illuminate, and can comprise one or more LEDs (8) working in collaboration with the lighting guide means (6).

At least one LED (8) of the lighting device (4) is connected with the electricity conducting means (7) and is at least partially housed in the orifice (6.3) disposed in the lighting guide means (6). Additionally, in a specific case of the invention there can be more than one LED (8) inside a single orifice (6.3) of the lighting guide means (6).

Additionally, in order to make better use of the light emitted by the LED (8), this light is emitted as light beams (8.1) that enter, through a side wall (6.3.1) of the orifice (6.3), the lighting guide means (6) and are led by and propagate through these until reaching the areas (2.3) that allow the light to exit, as shown in the enlargement of FIG. 2.

In this way, the light beams (8.1) enter in a more favourable manner the lighting guide means (6), facilitating their propagation through them.

As shown in FIG. 2, another peculiarity of the trim part (1) of the invention with an integrated lighting device (4) is that at least one LED (8) is not in direct correspondence with the areas (2.1) that allow the light to exit the decorative lining (2). This LED (8) is out of the projected area of the areas (2.3) that allow the light to exit to the lighting guide means (6).

In this way, an indirect illumination mode is sought in which the light emitted by the trim part (1) and specifically through the areas (2.3) that allow the light to exit, is evenly distributed throughout the lighting guide means (6), reducing its intensity with respect to a light beam emitted directly from the LED (8) in order to obtain a decorative lighting.

Another of the elements that form the lighting substrate (3) is the base substrate (5).

This base substrate can be formed by one layer or several superposed layers of different materials, formed by applying heat and applying pressure inside a press (17), depending on the manufacturing technology used to configure the lining (1).

These technologies can consist of injecting one or several plastic materials inside a mold, cold forming of one or several layers, applying heat on the layer or layers that form the base substrate before introducing it in a press (17), or hot forming in which the heat and pressure are applied simultaneously inside a press.

In order to carry out the connection between the connector (7.1) that forms part of the electricity conducting means (7) and the general power supply of the vehicle, it is necessary that the electricity conducting means (7) pass from the first face (5.1) of the base substrate (5), where at least part of the electricity conducting means (7) with the LED (8) are located, to the second face (5.2) of the base substrate (5).

Therefore, this base substrate (5) can have an orifice (5.4) for said passage of the electricity conducting means (7) from the first face (5.1) of the base substrate (5) to its second face (5.2). This orifice (5.4) can be an existing orifice, such as one corresponding to the position of a lighting console, or an orifice (5.4) provided specifically for this function.

By way of example, FIG. 5 shows a specific embodiment of the invention in which the trim part (1) with integrated lighting device consists of a roof trim.

Figure 6B:
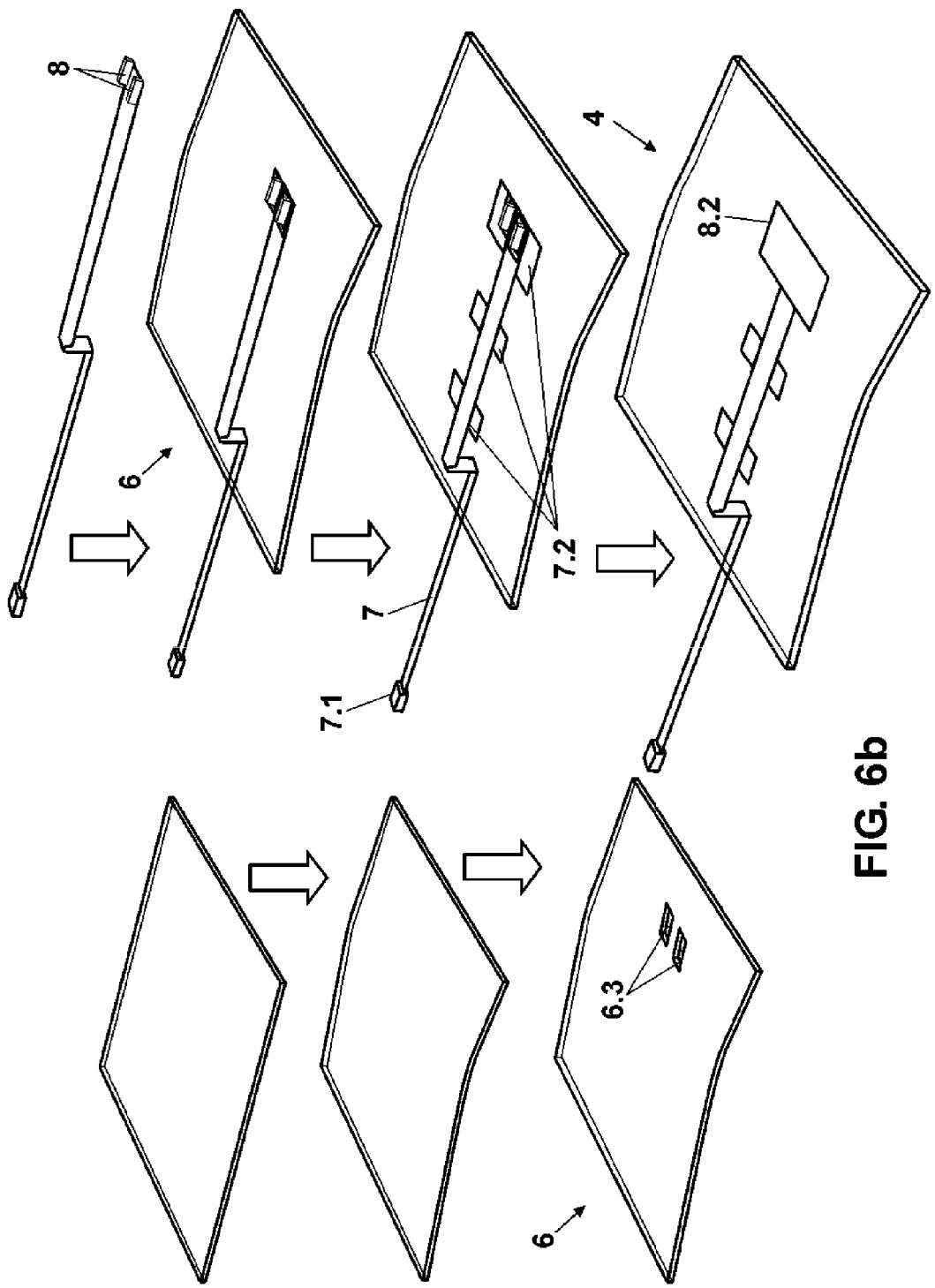
Figure 6G:
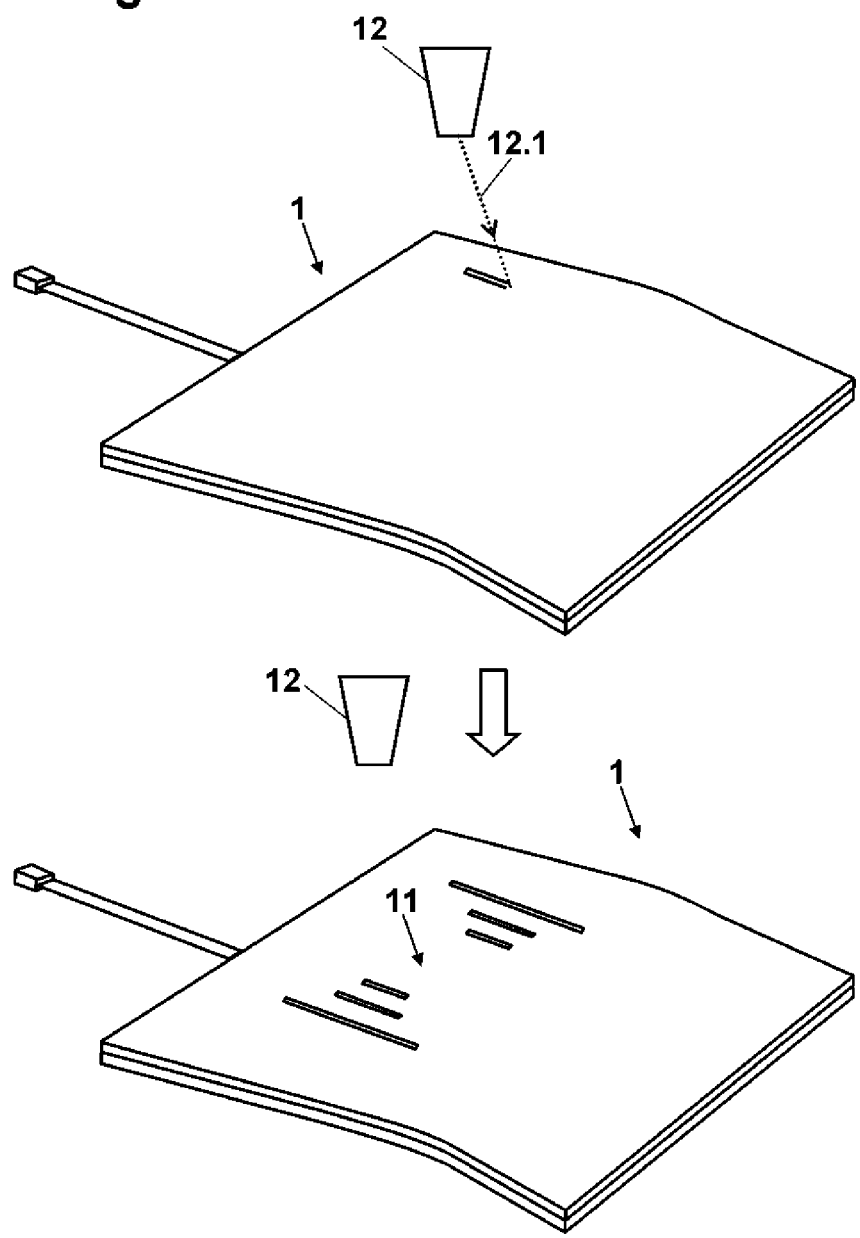

Having described the configuration of the trim part (1) with integrated lighting device of the invention, a manufacturing process for this trim part (1) is described that comprises the following stages:

A first group of preliminary stages for preparing the main elements of the trim part (1) with integrated lighting device, specifically:

Obtaining the base substrate (5) represented in FIG. 6*a;*
Obtaining the lighting device (4) represented in FIG. 6*b;*
Obtaining the lighting substrate (3) represented in FIG. 6*c:*
Obtaining the decorative lining (2) represented in FIG. 6*d;*
And a second group of stages for obtaining the trim part (1) with integrated lighting device itself:

Attaching the decorative lining (2) to the lighting substrate (3) represented in FIG. 6*e;*
Cutting the lighting substrate covered with the decorative lining (2) represented in FIG. 6*f;*
And finally, making the areas (2.3) that allow light to pass as represented in FIG. 6*g.*

Before obtaining the lighting substrate (3) represented in stage c), stage a) for obtaining the base substrate (5) represented in FIG. 6*a* is performed.

This stage consists of forming one layer or several superposed layers of different materials by applying heat and by applying pressure in a press (17), depending on the manufacturing technology used to configure the trim part (1).

This forming operation can consist of injecting one or several plastic materials in a mold, cold forming of one or several layers, applying heat to the layer or layers that make up the base substrate (5) before introducing it in a press (17), or hot forming where the heat and pressure are applied simultaneously in a press (17).

Similarly, before obtaining the lighting substrate (3) the stage b) for obtaining the lighting device (4) represented in FIG. 6*b* is performed.

To do so, first an light-conducting laminar element is formed to obtain the lighting guide means (6). This forming is performed such that the light-conducting de laminar element copies the final shape of the trim part (1) to favour a complete adaptation and integration of said lighting guide means (6) in the trim part (1).

Said light-conducting laminar element can be made, for example, of polymethylmethacrylate (PMMA) or polycarbonate (PC), which are characterised by their transparency among other factors.

After forming the light-conducting laminar element that configures the lighting guide means (6), at least one orifice (6.3) is made in the second face (6.2) thereof, which in a specific case can be a through orifice (6.3) as shown in the figures, so that the orifice (6.3) reaches the first face (6.1) that forms the lighting guide means (6), although it can be a non-through orifice.

This orifice (6.3) will allow housing, at least partially, at least one LED (8) and in a specific case will allow housing more than one LED (8).

After obtaining the orifice (6.3) or orifices (6.3) of the lighting guide means (6), at least one LED (8) is placed in the orifice (6.3) so that it is at least partially housed inside the orifice (6.3).

The LED or LEDs (8) are placed in the orifice (6.3) of the lighting guide means (6) such that its position is not in direct correspondence with the areas (2.3) that allow the light to exit the decorative lining (2).

In addition, said LED or LEDs (8) have the characteristic of emitting lighting beams (8.1) which, through a side wall (6.3.1) of the orifice (6.3), enter the lighting guide means (6) and are led by and propagate through them until reaching the areas (2.3) that allow the light to exit.

The lighting source is connected to the electricity conducting means (7) so that, once the LED or LEDs (8) that make up the lighting device (4) are in place, the electricity conducting means (7) are attached to the second face (6.2) of the lighting guide means (6), for example with adhesive tape (7.2).

In addition, positioning means (not shown) can be used for the LEDs (8) to guarantee their position inside the orifice (6.3) while handling the lighting guide means (6).

Moreover, for the specific case in which the orifice (6.3) of the lighting guide means (6) is a through orifice, some protection means (8.2) can be used located on the first face of the guide means that cover said orifice (6.3) in order to protect the LEDs (8) during the manufacturing process of the trim part (1).

After obtaining the base substrate (5) and the lighting device (4), stages a) and b), the lighting substrate formed by joining the two elements is obtained in stage c) of the process, shown in FIG. 6*c.*

To do so it is possible to apply attaching means (9), such as adhesive means, for example by using a spray (9.1), applied either on the first face (5.1) of the base substrate (5), on the second face (4.2) of the lighting device 84), or on both.

After applying the attaching means (9), the lighting device (4) is positioned and attached to the base substrate (5), or vice versa, so that the first face (5.1) of the lighting substrate is joined to the second face of the lighting device (4).

In addition, the electricity conducting means (7) can have on one of their ends a connector (7.1) to supply power to the lighting device (4) from the general power supply of the vehicle.

In a first variant of the invention, to execute the connection between said connector (7.1) and the general power supply of the vehicle it is necessary for the electricity conducting means to pass from the first face (5.1) of the base substrate (5), in which at least part of the electricity conducting means (7) and the LED (8) are placed, to the second face (5.2) of the base substrate (5).

To execute this passage from the first face (5.1) to the second face (5.2) of the base substrate (5), a second orifice (5.4) can be made on the base substrate (5) specifically for the connector (7.1) to pass, or an existing orifice can be used meant to assemble other components, such as an accessory of the trim such as a lighting console, a handle, etc.

Therefore, before attaching the lighting device (4) to the base substrate (5), it is necessary to have an orifice (5.4) in the latter.

Another variant that can allow connecting the lighting device (4) with the vehicle general power supply involves taking the connector (7.1) beyond the perimeter of the trim part (1), for example in the region of the trim part (1) that is in correspondence with one of the vehicle posts, normally in correspondence with the A post.

In this case it is not necessary for the electricity conducting means (7) and the connector (7.1) to pass from the first face (5.1) of the base substrate (5) to its second face (5.2).

Before manufacturing the trim part (1) with integrated lighting device, it is necessary to have a decorative lining (2) made in stage d) of the process.

The decorative lining (2) used can be of different types depending on the style of the vehicle or the requirements of the manufacturer of the trim part (1). Thus, it can be a woven element, a non-woven element or a non-woven fabric.

In a specific embodiment of the invention, and as shown in FIG. 6d, the decorative lining (2) is formed by a flocked element that in turn is formed by some support means (2.10), an adhesive layer (2.100) and a flock layer (2.1000) as described in the section of the description in which the product is described.

To manufacture this flocked decorative lining (2), firstly some support means (2.10) are used, which in a specific embodiment can be a non-woven element, for example, or the lighting guide means (6), as described above.

Then an adhesive layer (2.100) is applied, for example by using an adhesive spray (13). This adhesive layer (2.100) can be applied either along the entire surface of the support means (2.10) or in localised areas thereof.

Finally, using some flock supplying means (14) the flock layer (2.1000) is applied on the adhesive layer (2.100), thereby completing the stage for obtaining the decorative lining (2) according to this specific embodiment of the invention.

In another specific embodiment of the invention, not shown, the decorative lining (2) is formed by a layer of flock (2.1000) such that both the support means (2.10) and the adhesive layer (2.100) are eliminated, replacing the support means (2.10) by the lighting guide means (6) and the adhesive layer (2.100) by the adhesive means (9) for attaching the decorative lining (2) to the lighting substrate (3).

After obtaining the decorative lining (2), it is attached to the lighting substrate (3.1) and specifically to the first face (3.1) of the lighting substrate (3). This operation constitutes stage e) of the process, shown in FIG. 6e, and represents the beginning of the second large group of stages in which the trim itself is manufactured.

To attach the decorative lining (2) to the lighting substrate (3), some adhesive means (10) are applied, for example using a spray (10.1), either on the first face (3.1) of the lighting substrate (3) or on the second face (2.2) of the decorative lining (2), or on both.

When this has been done the two elements (2 and 3) are attached so that the second face (2.2) of the decorative lining (2) is joined to the first face (3.1) of the lighting substrate (3).

In the specific case in which the flocked decorative lining (2) is formed directly on the lighting guide means (6) when these act as support means (2.10), the stages d9 and e) are performed simultaneously.

After joining the three main elements that comprise the lining (1), and specifically the base substrate (5), the lighting substrate (4) and the decorative lining (2), the stage f) for cutting the assembly formed by these is executed by using cutting means (15) shown in FIG. 6f) and in order to adjust the final shape of the perimeter of the trim part (1), as well as any orifices that it may need.

To execute the cutting operation it is necessary to separate from the cutting area the electricity conducting means (7) and other elements that form part of the trim (1) that extend beyond the limits of the trim part (1), to prevent them from being cut or damaged.

To maintain the electricity conducting means (7) separated during the cutting operation, they can be provisionally joined to the second face (3.2) of the lighting substrate (3) with adhesive tape, for example.

This prevents damaging the electricity conducting means (7) during the cutting operation of the trim part (1), for example in its peripheral edge.

After executing the cutting operation the provisional attachment of the electricity conducting means (7) can be removed to leave them in their nominal position, as shown in FIG. 6f.

Finally, in order to complete the process for obtaining the trim part (1) with integrated lighting device (4), the areas (2.3) of the decorative lining (2) that allow the light to exit are created by removing at least one part of the decorative lining (2).

To do so, a laser (12) is used, shown in FIG. 6g, which emits a beam (12.1) that includes on the decorative lining (2) in order to remove at least one part of it.

This uncovers the lighting guide means (6) to create the areas (2.3) that allow the light to exit.

The areas of the decorative lining (2) that do not correspond to said areas (2.3) that allow the light to exit become the areas (2.4) of the decorative lining (2) that prevent the light from exiting.

In addition, other finishes can be obtained for the decorative lining (2) in the specific case that a flocked decorative lining (2) is used as that shown in FIGS. 4a and 4b.

The different finishes of the decorative lining (2) correspond to the greater or lesser removal of the material that forms part of said flocked decorative lining (2) by controlling the laser beam parameters.

Specifically, the following can be obtained:

Some areas (2.5) of partial removal of the flock areas corresponding to at least one part of the decorative lining (2) in which only part of the flock layer (2.1000) has been removed by a laser treatment of the decorative lining (2), where optionally the material that forms said flock layer (2.1000) is darkened, thereby modifying the appearance of said flock layer (2.1000).

Some areas (2.6) of full removal of the flock layer (2.1000) in at least one part of the flocked decorative lining (2) corresponding to at least one part of the decorative lining (2) made by completely removing the flock layer (2.1000) by laser treatment of the decorative lining (2), leaving uncovered the adhesive layer (2.100). This provides a colour contrast in the decorative lining (2) due to the colour of the adhesive layer (2.100) and the flock layer (2.1000).

Additionally, the possibility can be considered of obtaining an additional finish of the flocked decorative lining (2) formed by some areas (2.7) of complete removal of the flock layer (2.1000) and the adhesive layer (2.100) corresponding to at least one part of the flocked decorative lining (2), in which the flock layer (2.1000) and the adhesive layer (2.100) are removed completely by a laser treatment of the decorative lining (2), leaving uncovered the support means (2.10) that make up the flocked decorative lining (2). In this way, in the variant shown in FIG. 4a where the support means (2.10) are formed by an additional layer, a colour contrast is obtained in the decorative lining (2) due to the colour of the support means (2.10) and the flock layer (2.1000) and/or the adhesive layer (2.100).

The final finish of the flocked decorative lining (2), in this specific case, can consist of combining the areas (2.3) that allow light to pass and the areas (2.4) that prevent light from passing with some of the areas (2.5, 2.6, 2.7) described above.

This combination will allow obtaining a day effect and a completely different night effect in the trim part (1).

In the day effect, the vehicle occupants will predominantly perceive the finishes created by the areas (2.4) that prevent the light from passing, in combination with the areas (2.5) of partial removal of the flock layer (2.1000), the areas (2.6) of complete removal of the flock layer (2.100) and the areas (2.7) of complete removal of the flock layer (2.1000) and the adhesive layer (2.100).

In the night effect, instead, the vehicle occupants will predominantly perceive the finishes created by the areas (2.3) that allow the light to exit, and specifically the effect of the light emitted through these, in contrast with the areas (2.4) that prevent the light from exiting.

That is, the night effect allows the occupants to perceive the decorative lighting pattern (11) produced by the combination of the areas (2.3) that allow the light to exit and the areas (2.4) that prevent the light from passing when the lighting source (8) is on.

The invention claimed is:

1. Trim part for automobile with integrated lighting device for obtaining a decorative light that comprises a first face facing toward the inside of the vehicle cabin and through which the light can exit the inside of the trim, and a second face facing the vehicle body, such that said trim part comprises a lighting substrate and a decorative lining, wherein:
    the decorative lining comprises a first face facing the inside of the cabin and a second face) facing the vehicle body, and also comprises two differentiated areas, some areas that prevent the light from passing and other areas that allow the light to pass towards to the cabin;
    the lighting substrate comprises a first face facing the inside of the vehicle cabin and a second face opposite the first face facing the vehicle body, and wherein said lighting substrate comprises:
        a base substrate that comprises a first face facing towards the inside of the cabin and a second face facing towards the vehicle body, wherein said base substrate is formed by one layer or by a set of layers of different plastic materials;
        a lighting device that comprises:
            electricity conducting means;
            a lighting source consisting of a LED;
            lighting guide means for the light emitted by a lighting source in the form of a light-conducting laminar element, which have a first layer facing toward the inside of the vehicle cabin and a second face facing toward the vehicle body;
        adhesive means for joining the decorative lining to the lighting substrate;
    wherein:
    the lighting device is located between the base substrate and the decorative lining;
    the lighting guide means:
        are located between the decorative lining and the base substrate:
        comprise a light conducting laminar element that copies the shape of the trim part;
        have an orifice located on the second face of said guiding means in correspondence with the lighting source;
    at least one part of the electricity conducting means are located between said base substrate and the lighting guide means;
    the lighting source:
        is connected to the electricity conducting means and is at least partially housed in the orifice made in the lighting guide means;
        emits a lighting beam which, through a lateral wall of the orifice enters the lighting guide means and is led by and propagates through them, until reaching the areas that allow the light to exit;
    the decorative lining:
        covers the first face of the lighting substrate;
        has areas that allow light to pass comprising areas of the decorative lining obtained by removing at least one part of the decorative lining by a laser treatment, leaving uncovered the lighting guide means that the position of the lighting source is not directly in correspondence with the areas that allow light to exit the decorative lining.

2. Trim part for automobile with integrated lighting device according to claim 1, wherein the decorative lining comprises a flocked element formed by a layer of flock.

3. Trim part for automobile with integrated lighting device according to claim 2, wherein the decorative lining comprises some support means and an adhesive layer.

4. Trim part for automobile with integrated lighting device according to claim 2, wherein the decorative lining comprises some support means formed by the lighting guide means and an adhesive layer formed by the adhesive means for attaching the decorative lining to the lighting substrate.

5. Trim part for automobile with integrated lighting device according to claim 2, wherein the areas that prevent the light from passing comprise flocked areas of the decorative lining and the areas that allow light to pass comprise flocked areas of the lining subjected to a laser treatment for removing the material of the decorative lining.

6. Trim part for automobile with integrated lighting device according to claim 2, wherein the decorative lining comprises some areas of partial removal of the flock layer in at least one part of the decorative lining in which part of the flock layer has been removed by a laser treatment.

7. Trim part for automobile with integrated lighting device according to claim 3, wherein the decorative lining comprises some areas of complete removal of the flock layer in at least one part of the flocked decorative lining in which all of the flock layer has been removed by a laser treatment, leaving uncovered the adhesive layer.

8. Trim part for automobile with integrated lighting device according to claim 3, wherein the decorative lining comprises some areas of complete removal of the flock layer and the adhesive layer corresponding to at least one part of the decorative lining where the flock layer and the adhesive layer have been removed completely by a laser treatment, leaving uncovered the support layer of the decorative lining.

9. Trim part for automobile with integrated lighting device according to claim 1, wherein the material that forms the lighting guide means is polycarbonate (PC) or polymethylmethacrylate (PMMA).

10. Trim part for automobile with integrated lighting device according to claim 1, wherein the electricity conducting means consist of a flat cable.

11. Trim part for automobile with integrated lighting device according to claim 1, wherein the orifice made in the lighting guide means houses more than one LED.

12. Trim part for automobile with integrated lighting device according to claim 1, wherein the orifice is covered by the first face of the lighting guide means, with some protection means.

13. Trim part for automobile with integrated lighting device according to claim 1, wherein the LED has positioning means.

14. Trim part for automobile with integrated lighting device according to claim 1, wherein the base substrate comprises an orifice for passage of the electricity conducting means from the first face that forms the base substrate to the second face of the same.

15. Trim part for automobile with integrated lighting device according to claim 1, comprising attachment means for joining the base substrate to the lighting device consisting of adhesive means.

16. Trim part for automobile with integrated lighting device according to claim 1, wherein the trim consists of a roof trim, a door trim, a post trim or an element coupled to any one of said roof trim, door trim, or post trim to configure a complete trim.

17. Process for obtaining a trim part for an automobile with integrated lighting device for obtaining decorative lighting that comprises a first face facing the inside of the vehicle cabin and through which the light exit is established from the inside of the trim part, and a second face facing the vehicle body, such that said trim part comprises a lighting substrate and a decorative lining, wherein:
the decorative lining comprises a first face facing the inside of the cabin and a second face facing the vehicle body, and also comprises two differentiated areas, some areas that prevent the light from passing and other areas that allow the light to pass towards the inside of the cabin;
the lighting substrate comprises a first face facing the inside of the vehicle cabin and a second face opposite the first face, wherein said lighting substrate comprises:
a base substrate that comprises a first face facing towards the inside of the cabin and a second face facing towards the vehicle body, wherein said base substrate is formed by one layer or by a set of layers;
a lighting device that comprises:
electricity conducting means;
a lighting source that comprises a LED;
lighting guide means for the light emitted by a lighting source in the form of a light-conducting laminar element, which have first face facing toward the vehicle cabin and a second face facing toward the vehicle body;
adhesive means for joining the decorative lining to the lighting substrate;
characterised in that the process comprises the following stages:
obtaining the base substrate by forming one layer or more superposed layers of different plastic materials by applying heat, and by applying pressure in a press;
obtaining the lighting device by executing the following stages:
forming the light-conducting laminar element that forms the lighting guide means to copy the shape of the trim part;
making an orifice in the second face of the lighting guide means to house a lighting source wherein said lighting source emits a lighting beam that, through a side wall of the orifice, enters the lighting guide means and is led by and propagates in them to reach the areas that allow the light to exit;
positioning at least one said lighting source in said orifice of the lighting guide means so that the position of the lighting source is not in direct correspondence with the areas that allow the light to exit the decorative lining;
attaching at least part of the electricity conducting means to the second face of the lighting guide means;
obtaining the lighting substrate formed by joining the lighting device and the base substrate by positioning and attaching the lighting device on the base substrate, such that the first face of the base substrate is attached to the second face of the lighting device;
obtaining the decorative lining;
attaching the decorative lining to the first face of the lighting substrate by:
applying some adhesive means either on the first face of the lighting substrate or on the second face of the decorative lining, or on both;
positioning and attaching the decorative lining on the lighting substrate with the adhesive means, so that the second face of the decorative lining is joined to the first face of the lighting substrate;
cutting the lighting substrate covered with the decorative lining;
establishing the areas that allow light to pass by removing at least one part of the decorative lining by a laser treatment, uncovering the lighting guide means 18. Process for obtaining a trim part for an automobile with integrated lighting device according to claim 17, wherein obtaining the decorative lining comprises:
applying a first layer of flock.

19. Process for obtaining a trim part for an automobile with integrated lighting device according to claim 18, wherein obtaining the decorative lining comprises:
providing some support means;
applying a layer of adhesive on at least one part of said support means;
wherein the flock layer is applied on the adhesive layer.

20. Process for obtaining a trim part for an automobile with integrated lighting device according to claim 18, wherein the flocked decorative lining comprises some support means formed by the lighting guide means, on which is disposed an adhesive layer formed by the adhesive means for attaching the decorating lining to the lighting substrate and on which said flock layer is applied.

21. Process for obtaining a trim part for an automobile with integrated lighting device according to claim 18, wherein the decorative lining comprises some areas of partial removal of the flock layer in at least one part of the decorative lining, in which part of the flock layer has been removed by laser treatment.

22. Process for obtaining a trim part for an automobile with integrated lighting device according to claim 19, wherein the decorative lining comprises some areas of complete removal of the flock layer in at least one part of the decorative lining, where the flock layer has been completely removed by laser treatment, leaving uncovered the adhesive layer.

23. Process for obtaining a trim part for an automobile with integrated lighting device according to claim 19, wherein the decorative lining comprises some areas of complete removal of the flock layer and of the third adhesive means corresponding to at least one part of the decorative lining, where the flock layer and the adhesive layer have been completely removed by laser treatment, leaving uncovered the support means of the decorative lining.

24. Process for obtaining a trim part for an automobile with integrated lighting device according to claim 17, wherein the attachment of the lighting device on the base substrate is performed by some attaching means consisting of adhesive means.

\* \* \* \* \*